3,286,797
HYDRAULIC CONTROL UNIT
Kurt W. Leibfritz, Norridge, and Kenneth A. Bracki, Mount Prospect, Ill., assignors to Parker-Hannifin Corporation, Cleveland, Ohio, a corporation of Ohio
Filed June 29, 1964, Ser. No. 378,803
11 Claims. (Cl. 188—97)

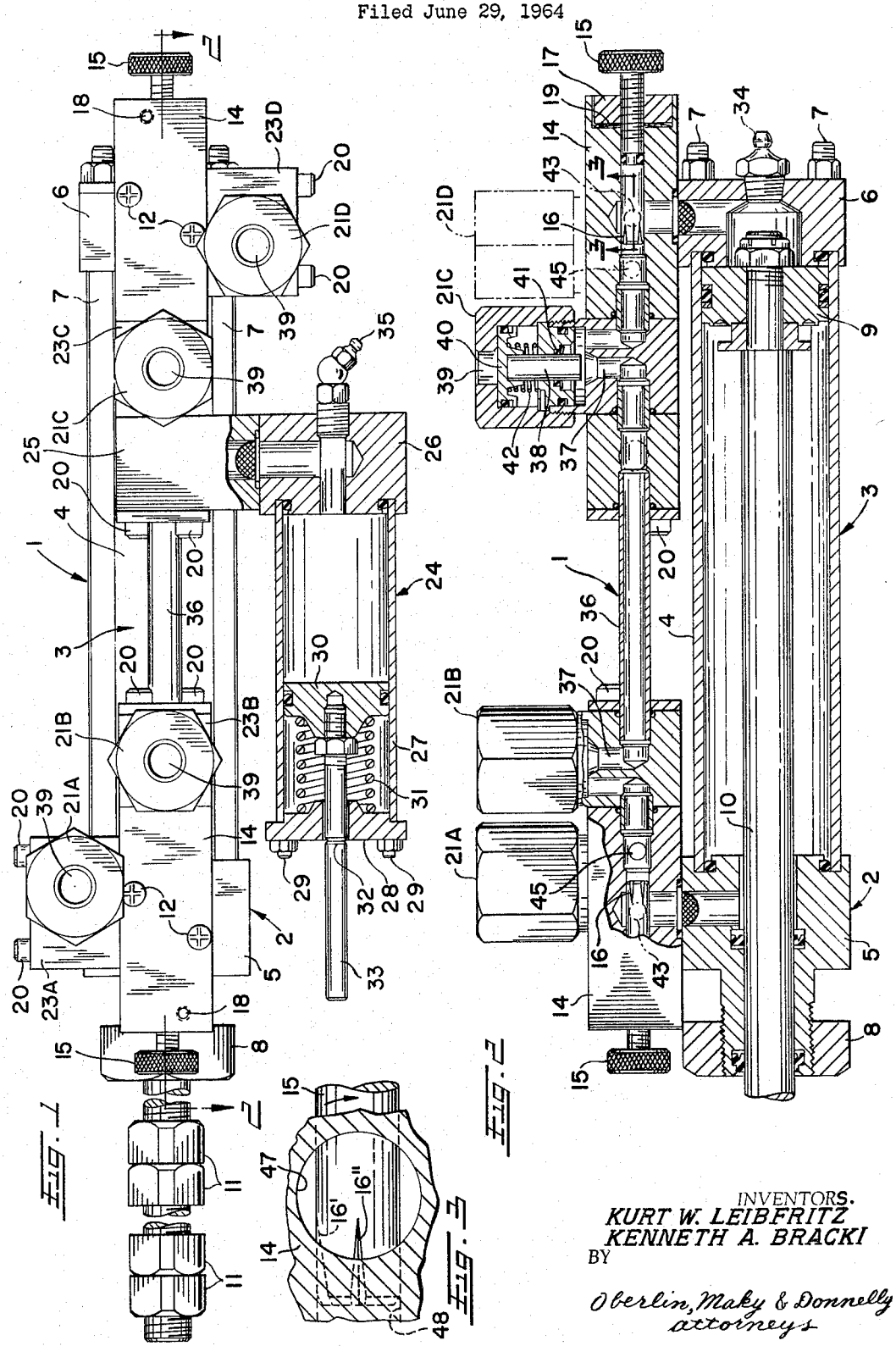

The present invention relates generally as indicated to a hydraulic control unit and more particularly to a hydraulic control unit for controlling as desired the movements of power operated devices such as machine tool slides and spindles.

It is a principal object of this invention to provide a hydraulic control unit of the character referred to which may be automatically operated to control the movements of a power operated device in either or both directions at equal or unequal rates through individually preset metering valves, to stop the motion of the device at any point of its stroke in either or both directions, and to provide for free movement of the device in either or both directions.

It is another object of this invention to provide a simple, compact, and self-contained unit of the character referred to which has pneumatically actuated bypass and shutoff valves which are automatically and selectively actuated to effect the various aforesaid controls on the movements of said device.

It is another object of this invention to provide a hydraulic control unit of the character referred to which has a novel form of metering valve for achieving fine, accurate adjustment of flow therethrough.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a top plan view with the accumulator or reservoir in cross-section;

FIG. 2 is a longitudinal cross-section view taken substantially along the line 2—2, FIG. 1; and FIG. 3 is a cross-section view on enlarged scale taken substantially along the line 3—3, FIG. 2.

Referring now in detail to the drawing, the hydraulic control unit 1 herein illustrated comprises a piston-cylinder assembly 2 in which the cylinder 3 comprises a length of tube 4 having end caps 5 and 6 secured at its ends by means of suitable tie bolts 7, the rod end cap 5 having a nut 8 screwed thereonto by which the cylinder 3 may be fixedly mounted on a suitable bracket or part of a machine tool or the like, not shown.

Reciprocable in the cylinder 3 is a piston 9 having a rod 10 extending through the rod end cap 5 for connection as by means of the nuts 11 threaded onto the rod to a reciprocating device, not shown, whose motions it is desired to control, as hereinafter described in detail.

It is to be noted that each end cap 5 and 6 is preferably fabricated from a rectangular block of metal and each has an angular passage leading into the respective end of the cylinder 3 on opposite sides of the piston 9 reciprocable therein from a plane side face of the respective end caps.

Each end cap 5 and 6 has secured thereon as by means of the screws 12, a metering valve body 14, the joint being sealed as by a suitable packing ring, and preferably a filter screen is clamped between each metering valve body 14 and the respective end cap 5 and 6. Each metering valve body 14 has adjustable therein a valve member 15 provided with metering slots 16 on its periphery which extend axially toward the inner end of the valve member and which are of gradually increasing circumferential width and radial depth toward that end. Each valve member 15 has threaded engagement with a nut 17, the nut being held against rotation with respect to the body 14 by means of a lock screw 18 having threaded engagement with the body 14, and being effective to lock the valve member 15 in desired adjusted position by urging the nut 17 and valve member 15 laterally with respect to the valve body 14. A spring washer 19 is interposed between each nut 17 and the respective valve body 14 to take up any looseness of the lock screw 18 in the threads of the body and in the recess (not shown) provided in the nut 17. Secured to the inner end and to one side of each metering valve body 14 by suitable screws 20 are normally open valves 21A, 21B, 21C, and 21D preferably of the same general construction, whereby only one of them has been shown in cross-section in FIG. 2. It is noted that the valve bodies 23A, 23B, 23C, and 23D as well as the metering valve bodies 14, are of rectangular cross-section to facilitate mounting as aforesaid, with intervening packing rings.

Secured to said assembly 1 is an accumulator or reservoir 24, through the intermediary of a block 25 secured to the valve body 23C by means of the screws 20, again there being a filter screen between the connector block 25 and the rectangular cross-section cap 26 of the accumulator.

The accumulator 24 further comprises a length of tube 27 and the end caps 26 and 28 are secured to the ends of said tube as by means of suitable tie bolts 29. Reciprocable in the accumulator 24 is a plunger 30 which is biased by the spring 31 in a direction tending to expel the liquid contents of the accumulator. Attached to the plunger 30 and extending through the end cap 28 is a gauge rod 33 which has a mark 32 thereon by which it can be determined if there is sufficient liquid in the system for the control piston 9 to make its full stroke toward the left as viewed in FIG. 2. For the purpose of filling and venting the unit 1 with liquid such as hydraulic oil there are provided suitable fittings 34 and 35 through which the liquid may be introduced and through which air may be vented. Extending between the block 25 and the valve body 23B which is connected to the end of the left metering valve body 14 is a length of tube 36. In the case of the valves 21C shown in cross-section, the passage from the accumulator 24 leads to a central passage 37 containing a seat with which the pneumatically actuated plunger 38 is adapted to be seated upon admission of air pressure through the port 39 acting on the large diameter plunger portion 40 of each valve member 38. It is to be noted that when the valve member 38 is engaged with its seat, the diameter of the seat and of the seal 41 are equal so that fluid pressure in the chamber around the seat will not move the valve member 38 away from the seat regardless of how great such pressure may be. When the air pressure acting on the plunger 40 is released, the spring 42 biases the valve member 38 to the open position as shown in FIG. 2.

As aforesaid, the other three valves 21A, 21B, and 21D which are shown in elevation or in phantom lines in FIG. 2 may be identical structure. In the case of these two bypass valves 21A and 21D the passages 43 upstream of the respective metering valve members 15 lead to the annular chambers around the valve members 38 therein while the passages 45 downstream lead to the central passages 37 containing the respective seats for said valve members 38.

In operation, if it is desired to control the leftward movement of the piston 9, air pressure applied at the port 39 of the bypass valve 21A will move the valve member 38 therein to seated position, whereby liquid displaced from the rod end of the cylinder 3 must pass through the metering slots 16 of the left metering valve 14 to the accumulator 24 via the open valve 21B, the conduit 36, and the coupling block 25. Since a greater volume of liquid is required to be introduced into the head end of the cylinder 3 than is being returned to the accumulator 24 from the rod end, such greater fluid is supplied from the accumulator 24 by movement of the plunger 30 toward the right. Accordingly, the movement of the piston rod 10 toward the left will be controlled by the adjusted flow capacity of the metering slots 16 of the left metering valve 14. The fluid from the accumulator 24 flows through the open valve 21C and through the open bypass valve 21D associated with the right metering valve 14.

If it is desired to control the rate of movement of the piston 9 toward the right in accordance with the setting of the right metering valve 14, air pressure is admitted to the port 39 of the bypass valve 21D to close it, whereupon the fluid displaced from the head end of the cylinder 3 must pass through the metering slots 16 of the right metering valve 14 and thence to the accumulator 24 via the open valve 21C. In turn, fluid flows from the accumulator circuit through the conduit 36 and the open valves 21B and 21A into the rod end of the cylinder 3.

If movement of the piston 9 is not to be controlled in either direction, the associated bypass valves 21A and 21D in the return circuit will be left open, instead of being closed by air pressure as aforesaid, in which case the returning fluid freely flows through the open bypass valve 21A or 21D into or from the accumulator 24. If the piston 9 is to be allowed to move freely in both directions as aforesaid all four valves 21A, 21B, 21C, and 21D will be allowed to remain in open position.

If the right movement of the piston 9 is to be stopped at any particular point, the right valve 21C will be closed by admission of air pressure through the port 39 thereof, and even though liquid pressure in the head end of the cylinder may rise to a very high value, due to inertia of the moving device to which the piston rod 10 is connected, such high pressure will not in any way tend to open the closed valve member 38 and thus the valve 21C remains closed even though the air pressure acting on plunger 40 is relatively low.

Similarly, if the left movement of the piston 9 is to be arrested the valve 21B is closed by air pressure into the port 39 thereof and, accordingly, fluid is trapped in the rod end of the cylinder 3 to stop the movement of the piston 9. If it is desired to lock the piston 9 against movement in either direction, air pressure may be admitted to the ports 39 of both of the shutoff valves 21B and 21C to close them and thereby trap liquid in both the rod and head ends of the cylinder 3; thus the piston 9 cannot move either to the right or to the left.

Referring now especially to FIG. 3, it is to be noted that the cross bore 47 in the metering valve body 14 is substantially larger (preferably at least 1½ times) than the longitudinal bore 48 in which the metering valve member 15 is movably adjusted by rotation thereof with respect to the nut 17.

With the present construction only two relatively large size metering slots 16 spaced 90° apart are required and yet the flow through the metering valve increases or decreases substantially uniformly as the valve member 15 is turned in one direction or the other. Assuming that the metering slots 16 are in the positions shown in FIG. 3, it can be seen that as the valve member 15 is turned 90° in the direction of the arrow, the total flow through the metering slots 16 will increase at a substantially uniform rate according to the lead of the intergaged threads of the nut 17 and valve member 15. Thus, the slot marked 16' will, after such 90° turning have the flow capacity of slot 16" plus the increase due to thread lead, and the slot 16" will, after such 90° turning have the flow capacity of slot 16' plus the increase due to thread lead. During succeeding 90° turning movements of valve member 15 in one direction or the other, the slots 16' and 16" will interchange as aforesaid and gradually increase or decrease the total flow therethrough according to thread lead.

It can be seen from the foregoing analysis, that only two relatively large size metering slots 16 need be employed, whereas, in prior art constructions in which cross bores in the valve body or bushing are of diameter smaller than that of the valve member, numerous metering slots, eight for example, are required and there are large variations in flow capacity as the valve member is adjusted. Moreover, the eight or so metering slots are necessarily quite small and thus are apt to be plugged by silt or other foreign matter in the oil. In the present construction two slots 16 suffice and these are larger and thus are not so apt to be plugged. It can be seen that the larger the diameter of the cross bore 47 in relation to the diameter of the valve member bore 48, the more nearly uniform are the increases or decreases in the flow capacity of the metering slots 16 as the valve member 15 is adjusted.

Other modes of applying the principle of the invention may be employed, change being made as regards the details described, provided the features stated in any of the following claims, or the equivalent of such, be employed.

We therefore particularly point out and distinctly claim as our invention:

1. In a hydraulic control unit, the combination of a cylinder; a piston reciprocable in said cylinder having a piston rod for attachment to a reciprocable device whose movements are to be controlled; an adjustable metering valve connected to one end of said cylinder for variably restricting the flow of fluid from said cylinder therethrough thus to control the rate of movement of said piston toward said one end of said cylinder; first and second fluid pressure actuated valves connected to said metering valve and having passages therethrough respectively to bypass the restriction of said metering valve and to permit flow of fluid therethrough downstream of said metering valve; and a movable valve member in each fluid pressure actuated valve having a plunger portion which, when communicated with a pressure source moves said valve member to passage closing position whereby, when said first valve is closed, movement of said piston toward said one end of said cylinder is controlled by said metering valve and, when said second valve is closed, movement of said piston toward said one end is stopped.

2. The unit of claim 1 wherein each valve member is spring biased to move the same to open position upon release of pressure acting on the plunger portion thereof.

3. The unit of claim 1 wherein each valve member is seated in the passage therein and sealed from its plunger portion on equal areas whereby fluid pressure between said seat and seal will be ineffective to tend to move said valve member to open position.

4. The unit of claim 1 wherein a second adjustable metering valve, and third and fourth fluid pressure actuated valves are connected to the other end of said cylinder and to each other as said first mentioned metering valve and said first and second valves respectively thus to permit free or controlled movement of said piston or to stop the movement of said piston toward said other end of said cylinder when said third and fourth valves are open or alternately closed by fluid pressure acting on the plunger portions of the respective valve members therein.

5. The unit of claim 4 wherein simultaneous fluid pressure actuation of said second and fourth valves locks said piston against movement in both directions.

6. The unit of claim 4 further comprising accumulator means in fluid communication with said second and fourth valves for supplying both ends of said cylinder with fluid.

7. The unit of claim 6 wherein said accumulator means includes a spring biased plunger for maintaining the fluid therein under pressure.

8. In a hydraulic control unit, the combination of a cylinder; a piston reciprocable in said cylinder having a piston rod for attachment to a reciprocable device whose movements are to be controlled; an adjustable metering valve connected to one end of said cylinder for variably restricting the flow of fluid from said cylinder therethrough thus to control the rate of movement of said piston toward said one end of said cylinder; said metering valve comprising a body having a bore intersected by a cross bore of diameter larger than that of said bore, a metering valve member having threaded engagement with said body and having a cylindrical portion in close sliding contact with said bore extending across said cross bore, said valve member having axially extending metering slots of progressively increasing cross-section area toward one end of said valve member for varying the flow of fluid from said cross bore to the portion of said bore axially beyond said one end of said valve member upon turning of said valve member in opposite directions.

9. The unit of claim 8 wherein a pair of such metering slots spaced 90° apart are provided whereby the control of the rate of flow of fluid therethrough varies at substantially a uniform rate as the valve member is turned in one direction or the other.

10. A metering valve for variably restricting the flow of fluid therethrough comprising a body having a bore, a cross bore of larger diameter than said bore extending through said bore, and a valve member having threaded engagement with said body and having a cylindrical portion in close sliding contact with said bore adapted to extend across said cross bore, said valve member having variable size metering slots in said cylindrical portion extending axially toward one end of said valve member, whereby upon rotation of said valve member in one direction or the other with said metering slots extending into said cross bore, the rate of flow of fluid through said metering slots between said cross bore and the portion of said bore axially beyond said one end of said valve member is varied.

11. The metering valve of claim 10 wherein said valve member has two metering slots 90° apart, whereby rotation of said valve member in one direction or the other as aforesaid will vary the rate of flow of fluid through said two metering slots at a substantially uniform rate, one of said two slots, except for variation in flow capacity due to the lead of the interengaged threads of said valve member and body, increasing or decreasing in flow capacity while the other decreases or increases as the valve member is turned in one direction or the other in said body.

References Cited by the Examiner

UNITED STATES PATENTS

| 758,020 | 4/1904 | Robinson | 188—97 |
| 1,152,339 | 8/1915 | Norton | 188—97 |
| 1,944,689 | 1/1934 | Heverly | 188—97 |
| 2,403,519 | 7/1946 | Gardiner | 251—205 X |
| 2,980,392 | 4/1961 | Greenwood | 251—205 X |
| 3,033,323 | 5/1962 | Manna | 188—97 |

MILTON BUCHLER, *Primary Examiner.*

G. E. A. HALVOSA, *Assistant Examiner.*